H. FUCHS.
VALVE CAP.
APPLICATION FILED FEB. 18, 1916.
1,297,824.
Patented Mar. 18, 1919.
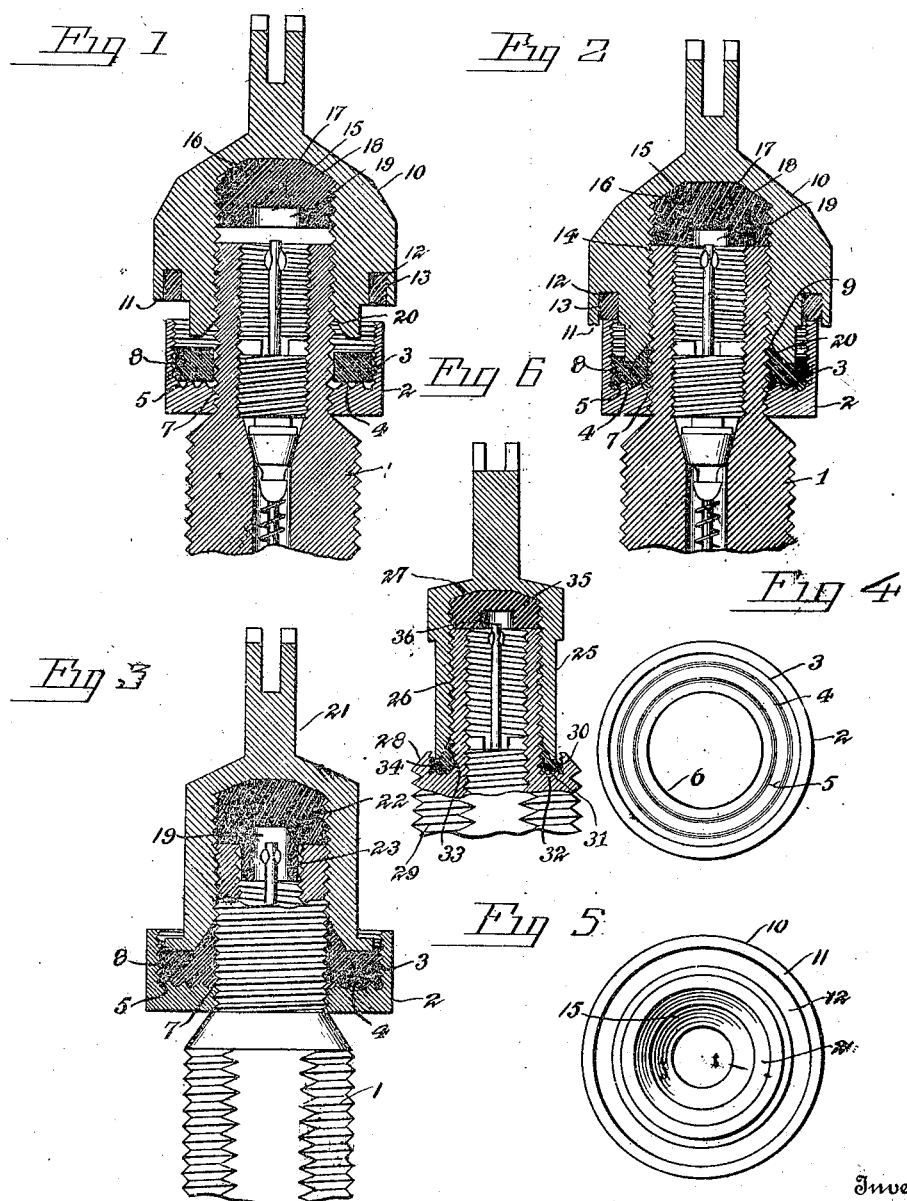
Inventor
Herman Fuchs
By Victor J. Evans
Attorney
Witnesses
F. Windridge
F. Hough

UNITED STATES PATENT OFFICE.

HERMAN FUCHS, OF ST. LOUIS, MISSOURI.

VALVE-CAP.

1,297,824.   Specification of Letters Patent.   Patented Mar. 18, 1919.

Application filed February 18, 1916. Serial No. 79,185.

*To all whom it may concern:*

Be it known that I, HERMAN FUCHS, a citizen of the United States, residing at St. Louis, in the State of Missouri, have invented new and useful Improvements in Valve-Caps, of which the following is a specification.

This invention relates to valve caps designed primarily for use upon the valve stems on automobile tires and the like.

The principal object of the invention is to provide a cap and collar both of which may be threadedly engaged with the valve stem on a tire, and with each provided with a packing so arranged that the cap and collar can be adjusted upon the valve stem to compress the packings and expand the same to prevent the escape of air from the valve stem when the valve therein is in a leaky condition.

Another object of the invention is to provide the collar associated with the cap and adjustably mounted upon the valve stem with a recess having a grooved bottom wall providing a seat for a packing which when the collar is adjusted to cause the packing to contact with the cap will be compressed and expanded by the grooves to force a portion of the packing into contact with threads on the valve stem and the inner peripheral wall of the collar.

Another object of the invention is to provide an annular and inclined shoulder upon the end of the valve cap which contacts with the packing in the collar, said shoulder being adapted to permit a portion of the packing adjacent the threads on the valve stem to expand when the cap and collar are engaged, thus increasing the surface of the packing in contact with the threads on the valve stem.

A still further object of the invention is to provide the cap between its ends with a shoulder having an annular groove in which is seated an auxiliary packing so arranged as to contact with the top of the collar when the packing in the cap and collar are under compression.

With these and other objects in view the invention resides in the novel combination and arrangement of parts which will be hereinafter described and particularly pointed out in the claim.

The preferred embodiment of the invention has been illustrated in the accompanying drawing, although no restriction is made to the precise details of construction therein shown, as changes, alterations and modifications within the scope of the claims may be resorted to when so desired.

In the drawing,—

Figure 1 is a vertical longitudinal sectional view through a cap constructed in accordance with the invention, and showing the same applied to a portion of a valve stem, the collar associated with the cap being shown in spaced relation thereto.

Fig. 2 is a view similar to Fig. 1 and showing the packings within the cap and collar under compression.

Fig. 3 is a view similar to Fig. 2, showing a modified form of the invention.

Fig. 4 is a top plan view of the collar removed from the valve stem and showing the packing removed from the seat within the collar.

Fig. 5 is a bottom plan view of the form of cap shown in Figs. 1 and 2.

Fig. 6 is a vertical sectional view through a valve stem and cap showing a still further modification of the invention.

Like characters of reference denote corresponding parts throughout the several views in the drawing.

Referring now to the drawing in detail, the numeral 1 designates a portion of a valve stem now in use upon pneumatic tires, and as no claim is laid to this particular form of valve stem, it is not thought necessary to further describe the same.

In the preferred and one modified form of the invention the improved cap includes a collar 2 provided in its upper face with a circular recess 3, said recess having a grooved bottom 4 with the side walls of the grooves inclining in opposite directions, as indicated by the numeral 5. The bottom of the collar 2 is provided with a centrally arranged opening 6 which communicates with the recess 3 and has its peripheral wall threaded, as at 7, to engage with the threads on the reduced end of the valve stem 1. The peripheral wall of the recess 3 is threaded throughout its height for a purpose which will be hereinafter described, while the grooved bottom 4 of the recess provides a seat for a packing 8, said packing having a centrally arranged aperture 9 adapted to register with the opening 6 in the bottom of the collar 2 and receive the reduced end of the valve stem 1.

Referring to the preferred form of cap shown in Figs. 1 and 2 of the drawing and designated by the numeral 10, it will be noted that the cap is reduced near its lower end to provide a shoulder 11 between the ends of the cap, said shoulder having opening out therethrough an annular groove 12 in which is seated an auxiliary packing 13 for contact with the top of the collar 2.

The cap 10 is provided with a longitudinally extending threaded bore 14 which receives the threaded and reduced end of the valve stem 1, said bore being provided at its closed end above the threaded peripheral wall with an inclined and annular shoulder 15 upon which and the closed end of the bore is seated a packing 16. The packing 16 has its upper peripheral edge 17 beveled, as indicated by the numeral 18, so that when the packing 16 is inserted within the bore the beveled portion 18 will lie flush with the annular shoulder 15 at the closed end of the bore, while said packing in its lower face is provided with a centrally arranged and circular recess 19 adapted to overlie the valve chamber, so that the packing 16 will not interfere with the projecting end of the valve within the stem when the packing is compressed.

The lower end of the cap 10 which is reduced to provide the shoulder 11 and extends below the same is provided at the open end of the bore 14 with an inclined shoulder 20, while the opposite end of the cap 10 is formed in the usual manner so that a wrench or screw driver may be engaged therewith to remove the same from the end of the valve stem.

When it is desired to use the preferred form of cap in connection with the stem on a pneumatic tire the collar 2 is first threadedly engaged with the reduced end of the stem and moved to a position upon the stem in which the bottom face of the collar is at the angle between the reduced and enlarged portions of the stem. The tire may now be inflated, and after this has been accomplished the cap 10 is applied to the end of the stem and adjusted until the packing 16 is compressed between the end of the stem and the shoulder 15, said adjustment also causing the end of the cap below the shoulder, at 20, to contact with the packing 8 in the collar 2 and the packing 13 with the top of the collar. Under ordinary conditions this adjustment is all that is required to prevent the escape of air through the stem, but should the valve within the stem become unreliable in preventing the escape of air from within the tire through the stem the collar 2 is now adjusted to enable the end of the cap below the shoulder 20 to force a portion of the packing 8 into contact with the side walls 5 of the grooves in the bottom of the recess in the collar, whereupon the packing 8 is expanded and forced into contact with the shoulder 20 and with the thread on the peripheral wall of the recess and valve stem. It is, of course, to be understood that the packings are formed from suitable compressible material, and that the packing 13 is more compressible than either of the packings 8 or 16 to permit a better adjustment of the cap 10 and collar 2 than would otherwise be obtainable.

From the foregoing description, it will be seen that when a portion of the packing 8 is forced into contact with the grooved bottom of the recess 3 the inclined walls of the grooves expand the packing 8, such expansion forcing a portion of the packing against the shoulder 20. Thus the surface of the packing engaged with threads on the reduced end of the valve stem is materially increased, and the escape of air which might possibly pass between the packing 16 and threaded surfaces of the cap and valve stem will be absolutely prevented from leaving or from escaping from the cap at this point.

It will also be noted that the inclined shoulder 15 in the cap through its contact with the beveled portion on the packing 16 will force said packing into tight engagement with the thread on the bore in the cap when the cap has been adjusted to compress the packing between the closed end of the bore and the top of the valve stem.

The construction of the modified form of cap shown in Fig. 3 in the drawing, and designated by the numeral 21, is the same as the preferred form of cap, with the exception that the shoulder 11 and groove 12 and packing 13 have been dispensed with, thus providing a cap which seals the valve stem at two places.

In the modified form of the invention shown in Fig. 3, a packing 22 is provided and performs the same function as the packing 16, and is constructed in a similar manner to the packing 16, with the exception that the packing 22 is provided on its under face with a depending flange 23 arranged concentrically about the recess 19 and adapted to fit within the valve chamber in the valve stem, thus increasing the efficiency of the packing in preventing the escape of air from the stem when said packing is compressed between the end of the stem and the closed end of the bore in the cap.

The modified form of the invention is applied to a valve stem in a manner similar to that described in the preferred form, it, of course, being understood that when the end of the cap 21 contacts with the packing in the collar 2, the packings 22 and 8 are compressed for the purpose above described.

While the collar and valve cap have been described and shown as applied to the reduced end of the stem, it will be understood that the bore in the cap and collar may be of sufficient diameter to engage with the enlarged portion of the stem if so desired, or may be made of such diameter as to permit the retaining caps now in use to inclose the same and engage with the thread on the enlarged portion of the stem.

In the modified form of the invention shown in Fig. 6 of the drawing, the hollow valve cap 25 is cylindrical in form and is internally threaded for the greater portion of its length as indicated by the numeral 26 and has arranged above the threaded portion the inclined annular shoulder 27, said cap above the shoulder 27 being reduced as in the other forms of the invention to receive a turning implement. The lower end of the cap 25 is beveled to provide an annular shoulder 28 corresponding with the shoulder on the lower ends of the caps shown in the preferred and second mentioned modification of the invention.

The valve stem 29 has a shoulder 30 thereon which is formed at the intersection of the reduced portion of the valve stem with the body thereof provided with an annular recess 31, the body of which is provided with concentrically arranged grooves 32 while the peripheral walls of the recess are threaded as indicated by the numeral 33, the thread on the inner peripheral wall of the recess being formed by the threads of the reduced portion of the valve stem which extends its entire length.

A packing 34 rests upon the grooved bottom of the recess 31 and is adapted to contact with the inclined annular shoulder 28 when the cap 25 is adjusted on the valve stem to compress said packing and the packing 35 arranged within the cap and seated upon the inclined shoulder 27 therein. The packing 35 being provided on its bottom face with a recess 36 which receives the projecting ends of the valve within the stem when the packings are compressed by the cap and the packing 34 expanded to contact with the grooves in the bottom of the recess 31.

From the above described arrangement of the parts in the modified form of the invention shown in Fig. 6 of the drawing, it will, of course, be understood that the cap is operated to compress the packings 35 and 34 as described in the operation of the cap as shown in the preferred and previously mentioned modified form of the invention.

From the foregoing description, taken in connection with the accompanying drawing, it is at once apparent that a valve stem cap has been provided which is simple in construction, inexpensive of manufacture and highly efficient in use.

Having thus described the invention, what is claimed as new, is:—

The combination of a threaded valve stem, a portion carried by said stem and projecting laterally therefrom and having a recess in its outer side, packing disposed in said recess, a cap threaded on the stem and having a portion to bear against said packing and also having a recessed lateral portion opposed to the edge of the outer wall of the recess in the stem portion, and packing in the recess of said lateral portion of the cap and positioned to be engaged by said wall edge.

In testimony whereof I affix my signature in presence of two witnesses.

HERMAN FUCHS.

Witnesses:
 FRED A. BLAKE,
 JOHN S. BLAKE.